US010866862B2

(12) United States Patent
Li (10) Patent No.: US 10,866,862 B2
(45) Date of Patent: Dec. 15, 2020

(54) METHOD AND APPARATUS FOR JOB OPERATION RETRY

(71) Applicant: ALIBABA GROUP HOLDING LIMITED, George Town (KY)

(72) Inventor: Qiang Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 130 days.

(21) Appl. No.: 15/924,118

(22) Filed: Mar. 16, 2018

(65) Prior Publication Data

US 2018/0203767 A1 Jul. 19, 2018

Related U.S. Application Data

(63) Continuation of application No. PCT/CN2016/098508, filed on Sep. 9, 2016.

(30) Foreign Application Priority Data

Sep. 18, 2015 (CN) .......................... 2015 1 0601116

(51) Int. Cl.
G06F 11/00 (2006.01)
G06F 11/14 (2006.01)
G06F 11/07 (2006.01)

(52) U.S. Cl.
CPC .......... *G06F 11/1438* (2013.01); *G06F 11/00* (2013.01); *G06F 11/0757* (2013.01); *G06F 11/1402* (2013.01); *G06F 2201/805* (2013.01)

(58) Field of Classification Search
CPC ............. G06F 11/1438; G06F 11/0757; G06F 11/1402
See application file for complete search history.

(56) References Cited

U.S. PATENT DOCUMENTS

2007/0245110 A1* 10/2007 Shibayama ........... G06F 3/0647
711/165
2010/0037223 A1 2/2010 Yorimitsu
(Continued)

FOREIGN PATENT DOCUMENTS

CN     1365114 A    8/2002
CN   102591598 A    7/2012
(Continued)

OTHER PUBLICATIONS

First Office Action issued by The State Intellectual Property Office of People's Republic of China in corresponding foreign Application No. 201510601116.5; dated Mar. 5, 2019 (4 pgs.).
(Continued)

*Primary Examiner* — Philip Guyton
(74) *Attorney, Agent, or Firm* — Finnegan, Henderson, Farabow, Garrett & Dunner, LLP (57) ABSTRACT

Embodiments of the present application provide operation retry methods and apparatuses. One exemplary method includes: detecting whether an operation of a job fails; if there is an operation failure, collecting statistics on a progress of the job; calculating a retry interval according to the progress of the job; and re-executing the operation after waiting for the retry interval. When an operation of a job fails, the retry interval can be adaptively calculated according to the progress of the job. This can help increase the length of the retry interval, especially for a long job. The job can thereby be retried dynamically, to cope with longer service interruption. Embodiments of the present application can help avoid waste of resource waste caused by job failure and job re-execution, and reduce the retry costs while ensuring the success rate of the job.

15 Claims, 5 Drawing Sheets

(56) References Cited

U.S. PATENT DOCUMENTS

| | | | |
|---|---|---|---|
| 2011/0197091 A1 | 8/2011 | Kurasawa et al. | |
| 2013/0100795 A1 | 4/2013 | Zhao et al. | |
| 2014/0025763 A1 | 1/2014 | Furlong et al. | |
| 2014/0358858 A1 | 12/2014 | Camble et al. | |
| 2015/0026525 A1* | 1/2015 | Byrne | G06F 11/079 |
| | | | 714/39 |
| 2016/0224425 A1* | 8/2016 | Hives | G06F 9/542 |

FOREIGN PATENT DOCUMENTS

| | | |
|---|---|---|
| CN | 103226300 | 7/2013 |
| CN | 103902399 A | 7/2014 |
| CN | 103988547 A | 8/2014 |
| CN | 103995691 A | 8/2014 |
| CN | 104067219 | 9/2014 |
| CN | 104182283 | 12/2014 |
| CN | 104346215 A | 2/2015 |
| EP | 02447825 | 5/2012 |
| JP | 2007-286709 A | 11/2007 |
| JP | 2011-164777 A | 8/2011 |
| JP | 2012-098816 A | 5/2012 |
| JP | 2014-530010 A | 11/2014 |
| WO | WO 2013/137917 A1 | 9/2013 |
| WO | WO 2017/045565 A1 | 3/2017 |

OTHER PUBLICATIONS

PCT International Preliminary Report on Patentability, International Search Report and Written Opinion issued in corresponding PCT Application No. PCT/CN2016/098508; dated Dec. 20, 2016 (11 pgs.).

Extended Search Report issued by the European Patent Office in corresponding foreign Application No. 16845679.6-1224 / 3352078; dated Oct. 1, 2018 (3 pgs.).

Supplementary European Search Report issued by the European Patent Office in corresponding foreign Application No. 16845679.6-1224 /3352078; dated Oct. 18, 2018 (8 pgs.).

Supplemental Search Report Issued by the State Intellectual Property Office of People's Republic of China in corresponding Chinese Application No. 2015106011165, dated Nov. 8, 2019 (1 page).

First Search Report Issued by the State Intellectual Property Office of People's Republic of China in corresponding Chinese Application No. 2015106011165, dated Feb. 25, 2019 (2 pages).

The Second Office Action by the State Intellectual Property Office of People's Republic of China in corresponding Chinese Application No. 2015106011165, dated Nov. 19, 2019 (13 pages).

Notice of Reasons for Rejection issued by Japan Intellectual Property Office, dated Sep. 15, 2020, in corresponding Japanese Application No. 2018-513324 (5 pages).

Search Report by Registered Search Organization issued by Mirai Intellectual Property Technology Research Center in Japan, dated Jul. 22, 2020, in corresponding Japanese Application No. 2018-513324 (37 pages).

\* cited by examiner

METHOD AND APPARATUS FOR JOB OPERATION RETRY

This application claims priority to International Application No. PCT/CN2016/098508, filed on Sep. 9, 2016, which claims priority to and the benefits of priority to Chinese Application No. 201510601116.5, filed on Sep. 18, 2015, both of which are incorporated herein by reference in their entireties.

TECHNICAL FIELD

The present application generally relates to the field of computer processing technologies, and in particular, to methods and apparatuses for operation retry of a job.

BACKGROUND

In a computer system, a job interacts with other systems (services) when running. The job fails when temporary unavailability (service interruption) occurs in the systems (services). In a big data scenario, when a running error occurs, the job is generally retried. That is, a retry is performed when other systems (services) recover, such that the job continues to run, in an attempt to achieve higher success rate of the job. If all retries fail, the job fails. For example, if another system (service) is unavailable for as long as 10 minutes, a collection of one or more retry intervals need to be greater than 10 minutes, in order for the retry to succeed. That way, it can be ensured that the job can continue to run when such a temporary unavailability occurs.

If the retry interval is adjusted to 10 minutes for all jobs, the retry costs are increased, which can be reflected in the following aspects:

1. With respect to a short job, for example, a job expected to run for only 30 minutes, the actual running time due to retry may be longer than normal.

2. When an administrator tries to manually stop a certain job, especially when an external system (service) is unavailable, the administrator needs to manually stop the job. Some associated adjustments and deployments may be needed as well. If a job retry happens to occur at that time, the job cannot be completely stopped until the retry is completed.

In light of this, according to existing techniques, an average value or a time interval satisfying a particular percentage, rather than a maximum retry interval, is generally selected as a retry interval. For example, if an average unavailable time of external systems (services) is 1 minute, and a maximum unavailable time is 10 minutes, a retry interval of about 2 minutes is generally selected to ensure that most retries can succeed.

However, with respect to a long job, such a solution may increase the retry costs. For example, for a job running for 10 hours, when the 10-hour job has run 80% (8 hours), if a 10-minute service interruption occurs and exceeds the retry interval, the job fails. If the job is re-executed, it means that the previous 8-hour running is wasted, and such cost is significant.

SUMMARY

In view of the foregoing problem, embodiments of the present application provide operation retry methods apparatus. One objective of the present application is to address the foregoing problem.

According to some embodiments of the present application, operation retry methods are provided. One exemplary method comprises: detecting whether an operation of a job fails; if it is detected that the operation fails, collecting statistics on a progress of the job; calculating a retry interval according to the progress of the job; and re-executing the operation after waiting for the retry interval.

According to some embodiments, the job is a data synchronization job, and the step of detecting whether an operation of the job fails can further include: determining that an operation of the data synchronization job fails when data reading from a source device fails or times out; and/or determining that an operation of the data synchronization job fails when interaction with a data synchronization service fails or times out; and/or determining that an operation of the data synchronization job fails when data writing into a destination device fails or times out.

According to some embodiments, the step of calculating a retry interval according to the progress of the job can further include: configuring an incremental factor according to the progress of the job; calculating a retry interval base according to a preset interval; and calculating the retry interval according to the incremental factor and the retry interval base.

According to some embodiments, the step of calculating a retry interval base according to a preset interval can further include: acquiring current number of retries; and calculating the product of the preset interval and the current number of retries as the retry interval base; or exponentially increase the preset interval based on the current number of retries as the retry interval base.

According to some embodiments, before the step of collecting statistics on a progress of the job, the method can further include: determining whether the operation needs to be re-executed; and if it is determined that the operation does not need to re-executed, performing the step of collecting statistics on a progress of the job; or if it is determined that the operation needs to be re-executed, exiting re-execution of the operation.

According to some embodiments, the step of determining whether the operation needs to be re-executed can further include: determining whether a number-of-retries condition and/or a state condition is satisfied; if the number-of-retries condition and/or a state condition is satisfied, determining that the operation does not need to be re-executed; and if the number-of-retries condition and/or a state condition is not satisfied, determining that the operation needs to be re-executed. The number-of-retries condition can be associated with a preset number-of-retries threshold. The state condition can include a condition that the job is stopped.

According to some embodiments of the present application, operation retry apparatuses are provided. One exemplary apparatus comprises: a job detection module configured to detect whether an operation of a job fails, if it is detected that the operation of the job fails, call a progress statistics module; the progress statistics module configured to collect statistics on a progress of the job; a retry interval calculation module configured to calculate a retry interval according to the progress of the job; and a job retry module configured to re-execute the operation after waiting for the retry interval.

According to some embodiments, the job detection module can further include: a first determination submodule configured to determine that an operation of a data synchronization job fails when data reading from a source device fails or times out; and/or a second determination submodule configured to determine that an operation of a data synchronization job fails when interaction with a data synchronization service fails or times out; and/or a third determination submodule configured to determine that an operation of a data synchronization job fails when data writing into a destination device fails or times out.

According to some embodiments, the retry interval calculation module can further include: an incremental factor calculation submodule configured to configure an incremental factor according to the progress of the job; a retry interval base calculation submodule configured to calculate a retry interval base according to a preset interval; and an increment adjustment submodule configured to calculate the retry interval according to the incremental factor and the retry interval base.

According to some embodiments, the retry interval base calculation submodule can further include: a number of retries acquisition unit configured to acquire current number of retries; and a constant calculation unit configured to calculate the product of the preset interval and the current number of retries as the retry interval base; or an exponent calculation unit configured to exponentially increase the preset interval based on the current number of retries as the retry interval base.

According to some embodiments, the operation retry apparatus can further include: a retry determination module configured to determine whether the operation needs to be re-executed; if it is determined that the operation needs to be re-executed, call the progress statistics module; if it is determined that the operation does not need to be re-executed, call a retry exit module; and the retry exit module configured to exit re-execution of the operation.

According to some embodiments, the retry determination module can further include: a condition determination submodule configured to determine whether a number-of-retries condition and/or a state condition is satisfied; if the number-of-retries condition and/or a state condition is satisfied, call a fourth determination submodule, the fourth determination submodule being configured to determine that the operation does not need to be re-executed; and if the number-of-retries condition and/or a state condition is not satisfied, call a fifth determination submodule, the fifth determination submodule being configured to determine that the operation needs to be re-executed. The number-of-retries condition can be associated with a preset number-of-retries threshold. The state condition can include a condition that the job is stopped.

According to some embodiments of the present application, when an operation of a job fails, a retry interval can be adaptively calculated according to a progress of the job. This may increase the length of the retry interval, especially in the case of a long job. Retry is therefore implemented in a dynamic manner, which can better cope with longer service interruption. Therefore, embodiments of the present application can help avoid waste of resource caused by job failure and job re-execution, and reduce the retry costs while ensuring the success rate of the job.

Further, according to some embodiments of the present application, a status or progress of the job is detected. When the job is stopped, retry can be terminated, which achieves fast retry termination and exit. This may further reduce waste of resources, and reduce the retry costs.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended claims.

Figure 1:
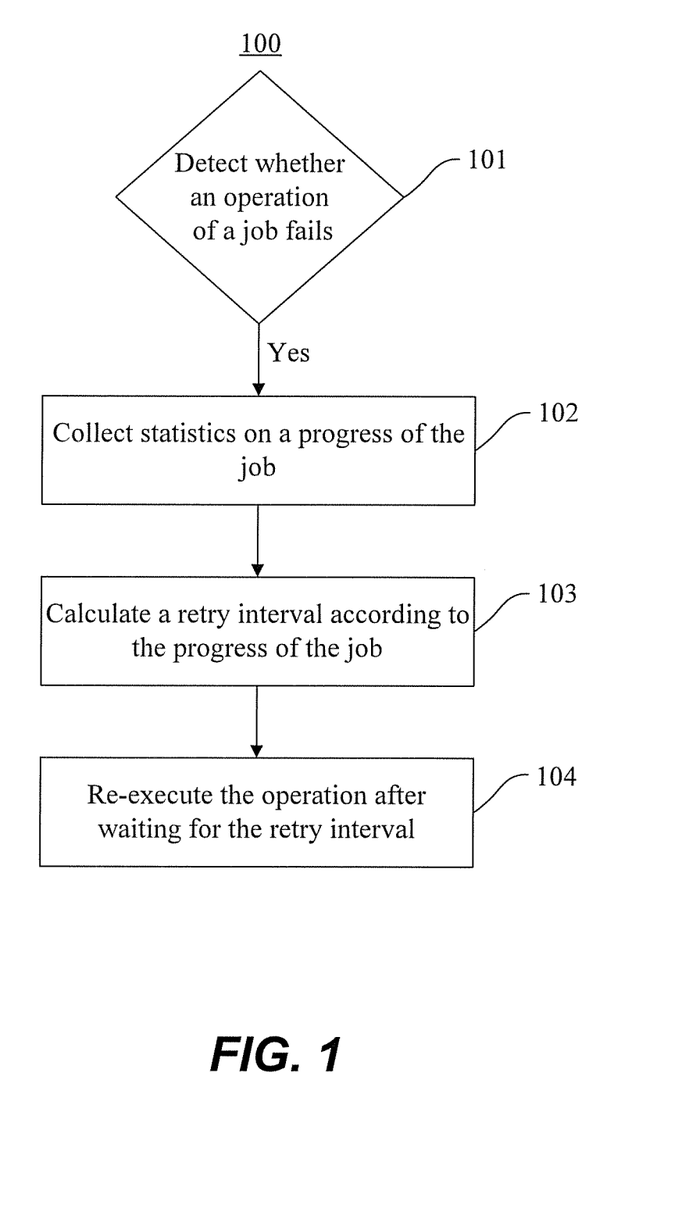
FIG. 1 is a flowchart of an exemplary operation retry method according to some embodiments of the present application.

FIG. 1 is a flowchart of an exemplary operation retry method according to some embodiments of the present application. The exemplary method 100 includes steps 101-104.

In step 101, it is detected whether an operation of a job fails. If there is an operation failure, step 102 is performed. In some operating systems, a job is an execution unit assigned by a computer operator (or a program referred to as a job scheduler) to the operating systems. For example, the job may be miming an application program, such as an employee payroll program executed every week. The job can run in a batch mode. The operator or job scheduler may assign a batch of jobs to be executed to the operating system. For example, the jobs can be associated with employee payroll, cost analysis, employee file upgrade, and the like. These jobs can be executed when the operating system is not engaged in time-sensitive interactive operations.

Figure 2:
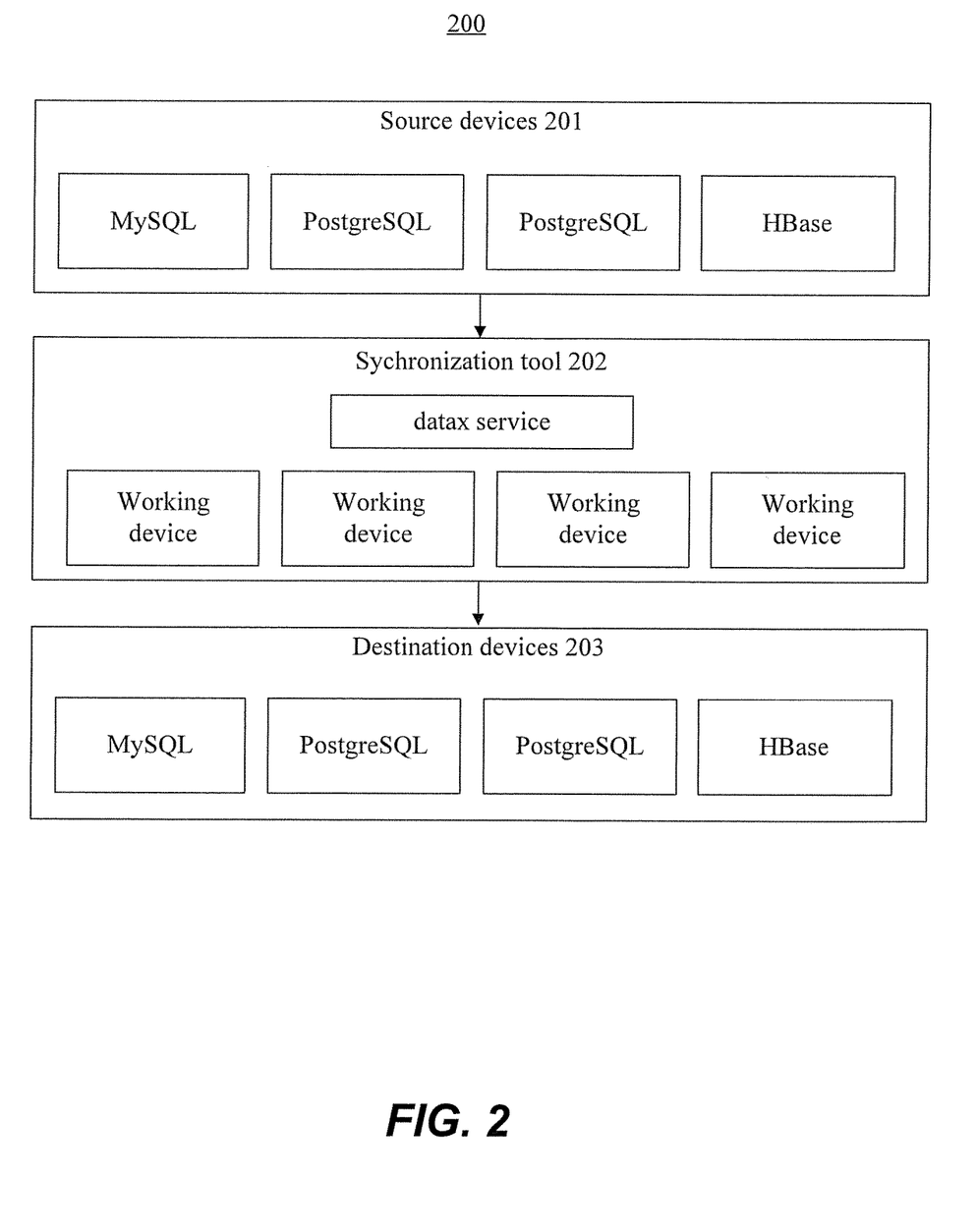
FIG. 2 is a schematic diagram of an exemplary offline synchronization system according to some embodiments of the present application.

As an example, the job can be a data synchronization job, and the data synchronization job may be executed by using a synchronization tool. FIG. 2 is a schematic diagram of an exemplary offline synchronization system according to some embodiments of the present application. As shown in FIG. 2, the exemplary offline synchronization system 200 includes a plurality of source devices 201, a synchronization tool 202, a plurality of destination devices 203. The synchronization tool 202 includes a synchronization platform datax service and a series of workers (working devices). The datax service receives a command for the job (for example, starting the job, stopping the job or the like), and a working device can be chosen to execute the job and returns a job status to the datax service.

During synchronization, the working device reads data from a source device 201, and writes the data into a destination device 203. The source devices 201 and the destination devices 203 can be any relational databases (for example, MySQL, PostgreSQL, and HBase), or non-relational databases. For example, the working device may read data from MySQL, and write the data into HBase.

For example, when being executed, a job interacts with a source device 201, a destination device 203, and the datax service. During an operation of data reading from the source device 201, a result returned by a data-reading application programming interface (API) provided by the source device 201 can be a success, a failure, or a timeout. If data reading from the source device 201 fails or times out, it can be determined that the operation of the data synchronization job fails.

During interaction with the datax service, a result returned by an interaction API provided by the datax service can be a success, a failure, or a timeout. If the interaction with the datax service fails or times out, it can be determined that the operation of the data synchronization job fails.

During an operation of data writing into a destination device 203, a result returned by a data-writing API provided by the destination device is usually a success, a failure, or a timeout. When data writing into the destination device fails or times out, it can be determined that the operation of the data synchronization job fails.

It is appreciated that the synchronization job and the failure determination manner thereof described above are merely examples. Embodiments of the present application can be applied to other jobs, and other job failure determination manners may be applied in different implementations or based on actual needs, which are not limited to the examples described herein.

Referring back to FIG. 1, in step 102, statistics on a progress of the job are collected. During an actual application, the working device may collect statistics on the progress of the job when executing the job. For example, statistics can be collected in batches, and a job may be divided into a plurality of fragments. Statistics on a progress of the job can be collected by collecting statistics on completion degrees of the fragments. For example, a job can be divided into 10,000 fragments, and the progress of the job increases by 1% every time 100 fragments are completed.

In step 103, a retry interval is calculated according to the progress of the job. In this example, the progress of the job is used as a factor, and the retry interval is calculated according to the factor. The retry interval can therefore be in direct proportion to the progress of the job, so that longer service interruptions can be coped with. For example, a retry interval at a progress of 80% is greater than a retry interval at a progress of 30%. This way, the job has sufficient time to wait for a service to recover, so as to avoid waste caused by job re-execution.

In some embodiments, step 103 may further include substeps S11-S13. In substep S11, an incremental factor is configured according to the progress of the job. In an actual application, the incremental factor can be decided by the execution state of the job, and can represent an impact of the progress of the job on the retry interval. Generally, the progress of the job is in direct proportion to the incremental factor. That is, a larger progress of the job indicates a larger incremental factor; conversely, a smaller progress of the job indicates a smaller incremental factor. For example, a job with a progress of 15% has an incremental factor of 1.15, and a job with a progress of 80% has an incremental factor of 1.80.

In substep S12, a retry interval base is calculated according to a preset interval. In some embodiments, a retry policy may be preset, for example, retrying according to a constant time or on an exponential growth basis, a preset interval, a preset maximum number of retries, or the like.

If a current number of retries is acquired, the retry interval base may be calculated according to the pre-set retry policy. If the retry policy is a constant retry interval policy, the retry is executed at the preset interval. For example, it may be specified that the retry is executed three times at an interval of 30 seconds. Then the product of the preset interval and the current number of retries may be calculated as the retry interval base.

If the retry policy is an exponential-growth retry policy, the preset interval can be increased exponentially based on the current number of retries, to calculate the retry interval base. For example, the retry interval base can be calculated in the following manner: the retry interval base=the interval$*2^{n-1}$, where n is the current number of retries. For example, it is specified that the retry is executed four times at an interval of 10 s. That is, a retry interval base for the first retry is 10 s, a retry interval base for the second retry is 10 s*2, a retry interval base for the third retry is 10 s*4, and a retry interval base for the fourth retry is 10 s*8.

In substep S13, the retry interval is calculated according to the incremental factor and the retry interval base. For example, in some embodiments, the product of the incremental factor and the retry interval base may be directly calculated as the retry interval.

In step 104, the operation is re-executed after waiting for the retry interval.

In some embodiments, the job may be retried after waiting for the retry interval. For example, the job may be a data synchronization job as described above with reference to FIG. 2. When the job fails, data reading from the source device may be re-executed, or interaction with the datax service may be re-executed, or data writing into the destination device may be re-executed.

In a big data scenario, when an operation error occurs, the job is generally retried. That is, a retry is performed when other systems (services) recover, such that the job continues to run, in an attempt to achieve higher success rate of the job. If all retries fail, the job fails. For example, with respect to offline synchronization using the datax service, the synchronization amount on an electronic business platform can be about 300 T per day, and there are about 60,000 synchronization jobs per day.

These jobs are completed within different time periods, some are completed in 30 minutes, some are completed in 2 hours, some are completed in 10 hours, and some are completed in an even longer time.

With respect to a job completed in a relatively short time (for example, 30 minutes), that is, a short job, if there is an occasional error (such as network disconnection or service restart) and recovery does not occur when the retry ends, the costs for re-executing the entire job may be acceptable. However, some jobs may be completed in a relatively long time, for example, 10 hours, that is, a long job. If the job progress has reached more than 50%, and the retry does not succeed, the costs for re-executing the entire job are relatively high.

If retries are set simply by adjusting parameters such as the number of retries or the retry intervals, all jobs may incur the same retry costs. For example, if the retry interval is adjusted to 10 minutes, retry time for short jobs may even be longer than the actual execution time, which is inappropriate and can lead to significant cost. Further, when a user wants to stop a job and the job happens to be retried at that point, the user has to wait until the retry ends, before the job can be stopped.

The existing retry policies attempt only to cope with the problem of low job success rates, and are mainly done through the adjustment of number of retries or the adjustment of retry intervals. However, with either the constant-time retry policy or exponential-growth retry policy, the problem of retry costs are not addressed, and extra retry costs are incurred.

According to some embodiments of the present application, when an operation of a job fails, a retry interval is adaptively calculated according to the progress of the job. This can help increase the length of the retry interval for long jobs. The job can be thereby retried dynamically, which can cope with longer service interruptions, avoid waste of device resources caused by job failure and job re-execution. That way, retry costs can be reduced while maintaining job success rates.

Figure 3:
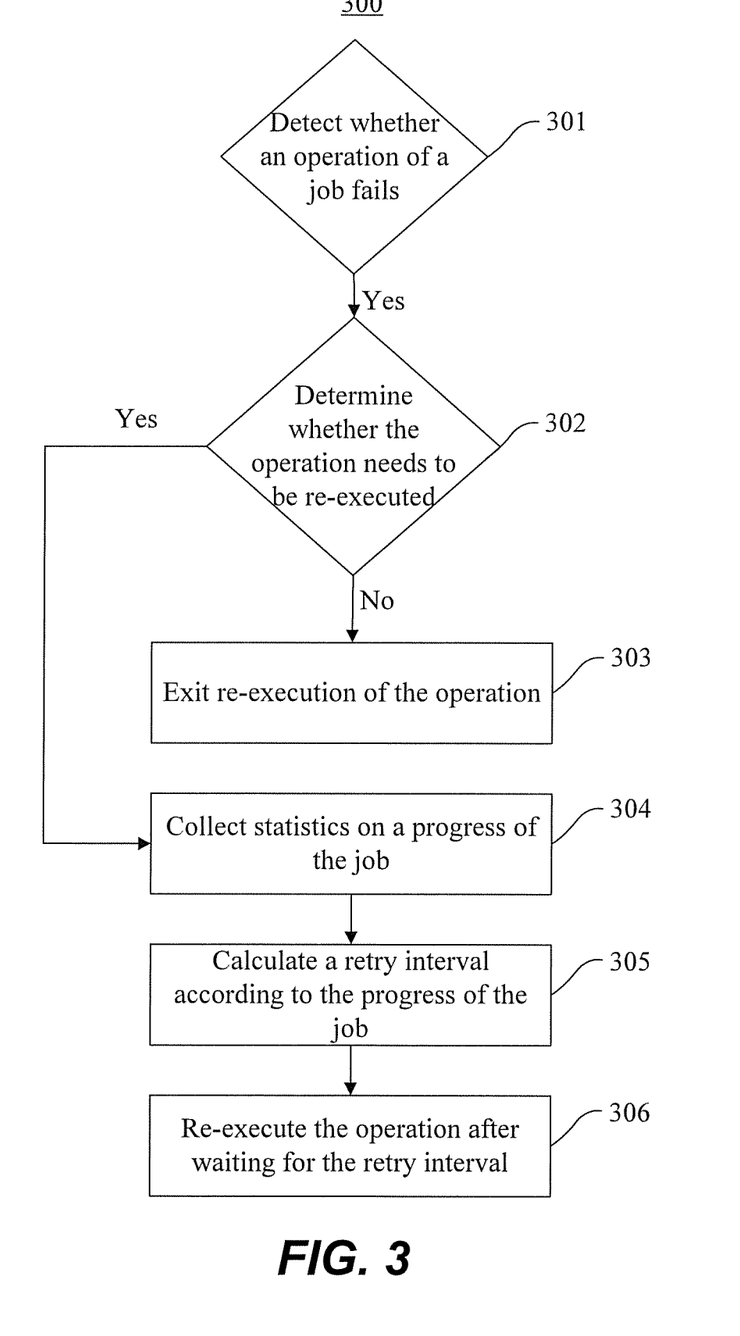
FIG. 3 is a flowchart of an exemplary operation retry method according to some embodiments of the present application.

FIG. 3 is a flowchart of an exemplary operation retry method according to some embodiments of the present application. The exemplary operation retry method 300 includes steps 301-306.

In step 301, it is detected whether an operation of the job fails. If it is detected that there is an operation failure, the process proceeds to step 302.

In step 302, it is determined whether the operation needs to be re-executed. If it is determined that the operation needs to be re-executed, step 304 is performed. In step 304, statistics on a progress of the job are collected. In step 305, a retry interval is calculated according to the progress of the job. In step 306, the operation is re-executed after waiting for the retry interval.

If in step 302, it is determined that the operation does not need to be re-executed, step 303 is performed. In step 303, the process exits re-execution of the operation. For example, there may be a preset retry policy, and the job is retried when conditions associated with the policy are satisfied; otherwise, the retry is not performed.

In some embodiments, step 302 may further include additional substeps. In substep S21, it is determined whether a number-of-retries condition or a state condition is satisfied. If the number-of-retries condition or the state condition is satisfied, the process proceeds to substep S22. In substep S22, it is determined that the operation does not need to be re-executed.

If the number-of-retries condition or the state condition is not satisfied, the process proceeds to substep S23. In substep S23, it is determined that the operation needs to be re-executed. For example, the number-of-retries condition can include a condition of whether a preset number-of-retries threshold is reached, and the state condition can include a condition that the job is stopped. In some embodiments, retry policies can be preset for a job. That is, when configuring the job, a user specifies how retries are performed if an error occurs in the execution of the job. For example, retry policies can include retrying according to a constant time or on an exponential growth basis, retying based on an allowed maximum number of retries (that is, a number-of-retries threshold), and the like.

When the job is assigned to a working device, the working device executes the retry according to the retry policy. Every time a retry is executed, the current number of retries may be recorded for comparison with the allowed maximum number of retries. When the allowed maximum number of retries is exceeded, retries may no longer be executed; otherwise, retries can be continued. Because the job is executed on the working device, the working device can acquire or detect an execution state of the job during execution. The execution state can include, for example, normal execution, stopping execution, an execution time, an execution progress, and so on.

If the user wants to manually stop the job, for example, when the user needs to manually perform operation and maintenance to stop the job and make adjustments and deployments due to unavailability of an external system (service), it is desirable that the working device stops the job as soon as possible after receiving a job stop instruction. If the job happens to be retried at that point, according to existing retry policies, the job cannot be successfully stopped until the entire retry process completely ends. For example, a user configures that a job is to be retried for 10 times, the user discovers a configuration error somewhere and wishes to stop the job, but the job happens to be retried at that point. The user has to wait until all 10 retries end, before the job can be stopped.

According to some embodiments of the present application, a state of the job is detected, and when the job is stopped, the retry can be terminated. This may help implement fast retry ending and exiting, and thereby reducing waste of device resources and the retry costs.

It is appreciated that the exemplary methods are described above as combinations of a series of actions for illustration purpose and are exemplary only. It is appreciated that the present application is not limited to the above-described orders or combinations. Some steps may be performed in other orders or at the same time according to some embodiments of the present application.

Figure 4:
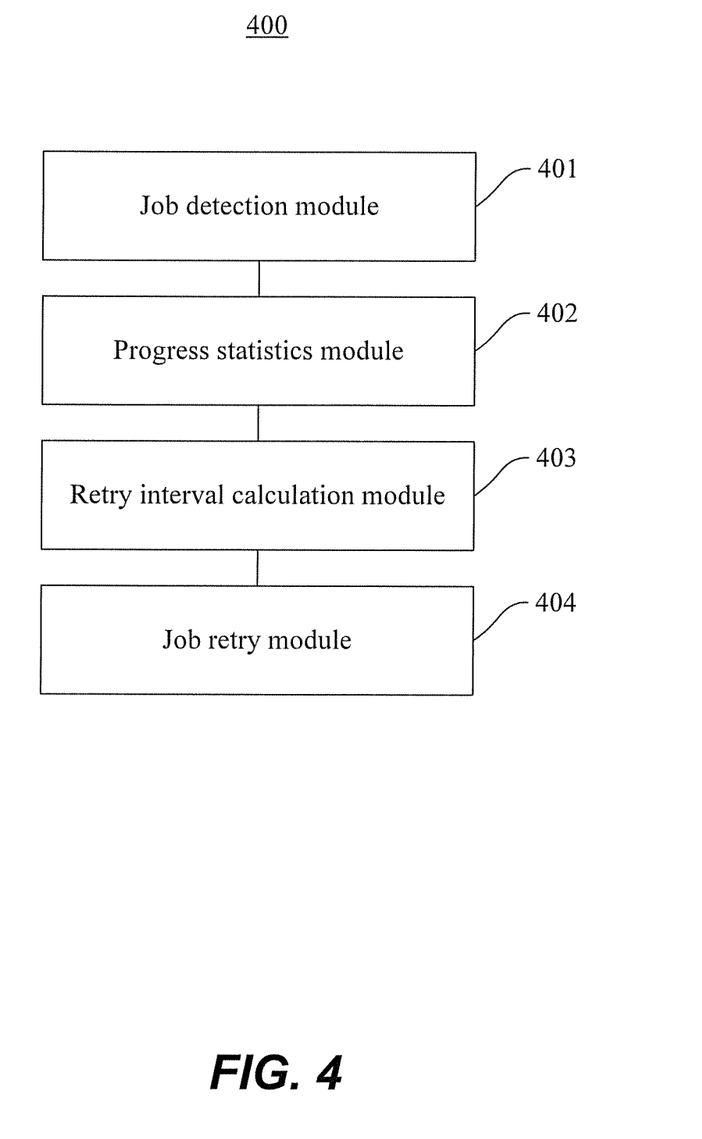
FIG. 4 is a structural block diagram of an exemplary operation retry apparatus according to some embodiments of the present application.

FIG. 4 is a structural block diagram of an exemplary operation retry apparatus 400 according to some embodiments of the present application. The exemplary operation retry apparatus 400 includes a job detection module 401, a progress statistics module 402, a retry interval calculation module 403, and a job retry module 404.

The job detection module 401 can be configured to detect whether an operation of the job fails. If it is detected that the operation fails, the job detection module 401 can call the progress statistics module 402.

The progress statistics module 402 can be configured to collect statistics on a progress of the job.

The retry interval calculation module 403 can be configured to calculate a retry interval according to the progress of the job.

The job retry module 404 can be configured to re-execute the operation after waiting for the retry interval.

In some embodiments of the present application, the job detection module 401 can include one or more of a first determination submodule, a second determination submodule, and a third determination submodule. The first determination submodule can be configured to determine that an operation of the data synchronization job fails when data reading from a source device fails or times out. The second determination submodule can be configured to determine that an operation of the data synchronization job fails when interaction with a data synchronization service fails or times out. The third determination submodule can be configured to determine that an operation of the data synchronization job fails when data writing into a destination device fails or times out.

In some embodiments of the present application, the retry interval calculation module 403 may include an incremental factor calculation submodule, a retry interval base calculation submodule, and an increment adjustment submodule. The incremental factor calculation submodule can be configured to configure an incremental factor according to the progress of the job. The retry interval base calculation submodule can be configured to calculate a retry interval base according to a preset retry interval. The increment adjustment submodule can be configured to calculate the retry interval according to the incremental factor and the retry interval base.

In some embodiments of the present application, the retry interval base calculation submodule may include a number of retries acquisition unit, and a constant calculation unit or an exponent calculation unit. The number of retries acquisition unit can be configured to acquire a current number of retries. The constant calculation unit can be configured to calculate the product of the preset interval and the current number of retries as the retry interval base. The exponent calculation unit can be configured to increase the preset interval based on the current number of retries as the retry interval base.

Figure 5:
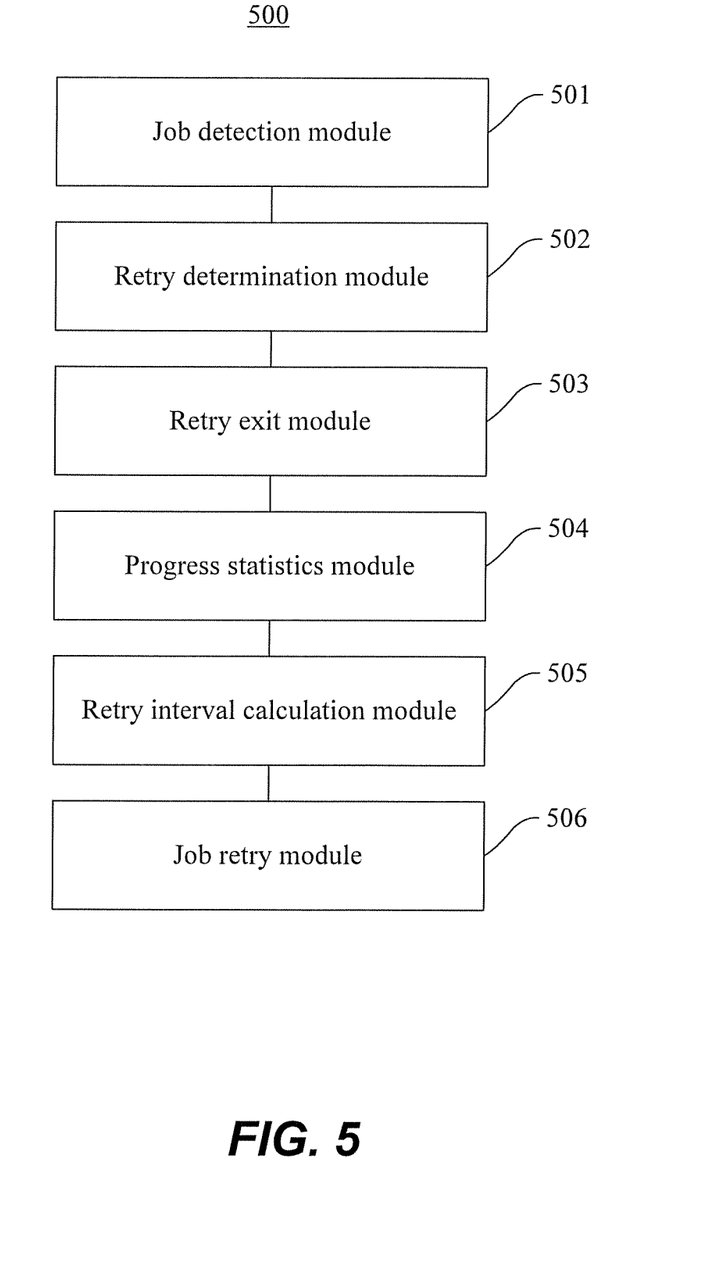
FIG. 5 is a structural block diagram of an exemplary operation retry apparatus according to some embodiments of the present application.

FIG. 5 is a structural block diagram of an exemplary operation retry apparatus 500 according to some embodiments of the present application. The exemplary operation retry apparatus 500 can include a job detection module 501, a retry determination module 502, a retry exit module 503, a progress statistics module 504, a retry interval calculation module 505, and a job retry module 506.

The job detection module 501 can be configured to detect whether an operation of the job fails. If it is detected that the operation fails, the job detection module 501 can be configured to call a retry determination module 502.

The retry determination module 502 can be configured to determine whether the operation needs to be re-executed. If it is determined that the operation needs to be re-executed, the retry determination module 502 can call the progress statistics module 504. The progress statistics module 504 can be configured to collect statistics on a progress of the job. The retry interval calculation module 505 can be configured to calculate a retry interval according to the progress of the job. The job retry module 506 can be configured to re-execute the operation after waiting for the retry interval.

Alternatively, if it is determined that the operation does not need to be re-executed, the retry determination module 502 can call a retry exit module 503. The retry exit module 503 can be configured to exit re-execution of the operation.

In some embodiments of the present application, the retry determination module 502 may include a condition determination submodule, a fourth determination submodule, and a fifth determination submodule.

The condition determination submodule can be configured to determine whether a number-of-retries condition and/or a state condition is satisfied. If the number-of-retries condition and/or the state condition is satisfied, the condition determination submodule can be configured to call a fourth determination submodule. The fourth determination submodule can be configured to determine that the operation does not need to be re-executed.

If the number-of-retries condition and/or the state condition is not satisfied, the condition determination submodule can be configured to call a fifth determination submodule. The fifth determination submodule can be configured to determine that the operation is to be re-executed.

In some embodiments, for example, the number-of-retries condition can include a condition that the current number of retries exceeds a preset number-of-retries threshold, and the state condition can include a condition that the job is stopped. For specification processing performed by the exemplary apparatuses, reference can be made to the corresponding steps in the above-described exemplary methods.

The exemplary embodiments in this specification are described in a progressive manner. Description of some examples may focus on differences from the other examples. Reference can be made to related description about similar steps or processing provided with respect to other examples.

It is appreciated that the embodiments of the present application may be provided as a method, an apparatus, or a computer program product. For example, the embodiments of the present application may be implemented as a hardware embodiment, a software embodiment, or an embodiment combining software and hardware. Moreover, the embodiments of the present application may be in the form of a computer program product implemented on one or more computer usable storage media (including, but not limited to, a magnetic disk memory, a CD-ROM, an optical memory, and the like) including computer-readable program codes therein. The storage media can include a set of instructions for instructing a computer device (which may be a personal computer, a server, a network device, a mobile device, or the like) or a processor to perform a part of the steps of the methods described in the embodiments of the present application. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

For example, the embodiments of the present application can be implemented by a computer device that includes one or more processors (CPUs), an input/output interface, a network interface, and a memory. The memory may include a volatile memory, a random access memory (RAM) and/or a non-volatile memory or the like in a computer readable medium, for example, a read-only memory (ROM) or a flash RAM. The memory is an example of the computer readable medium. The computer readable medium includes non-volatile and volatile media as well as movable and non-movable media. Information storage can also be implemented in other applicable manners in related art. Information stored in the memory may be a set of computer readable instructions, a data structure, and a module of a program or other data. An example of the storage medium of the computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition therein, the computer readable medium does not include transitory media, such as a modulated data signal and a carrier.

The exemplary embodiments of the present application are described herein with reference to flowcharts and/or block diagrams of the exemplary methods, terminal devices (systems) and computer program products. It is appreciated that computer program instructions may be used to implement each process and/or block in the flowcharts and/or block diagrams, and combinations of processes and/or blocks in the flowcharts and/or block diagrams. For example, these computer program instructions may be provided to a computer, an embedded processor, or a processor of another programmable data processing terminal device to generate a machine. The instructions executed by a computer or a processor of another programmable data processing terminal device can generate an apparatus for implementing a specified function corresponding to one or more processes described in the flowcharts and/or in one or more blocks in the block diagrams.

These computer program instructions may also be stored in a computer readable memory that can instruct the computer or another programmable data processing terminal device to work in a particular manner, so that the instructions stored in the computer readable memory generate an article of manufacture that includes an instruction apparatus. The instruction apparatus can implement a specified function corresponding to one or more processes in the flowcharts and/or in one or more blocks in the block diagrams.

These computer program instructions may also be loaded onto a computer or another programmable data processing terminal device, so that a series of operations and steps are performed on the computer or another programmable terminal device, thereby generating computer-implemented processing. Therefore, the instructions executed on the computer or another programmable terminal device can cause implementation of a specified function in one or more processes in the flowcharts and/or in one or more blocks in the block diagrams.

Exemplary embodiments of the present application have been described above. It should be appreciated that one skilled in the art can make changes and modifications to these embodiments in light of the disclosure and concepts herein. Such changes and modifications, and the equivalents thereof, shall all fall within the scope of the present application.

It should be appreciated that relational terms herein, such as first and second, are only used to distinguish one entity or operation from another entity or operation, and do not necessarily require or imply that any actual relationship or sequence exists between these entities or operations. Moreover, the terms "include," "comprise," or any other variants thereof are intended to cover non-exclusive inclusion, so that a process, a method, an article, or a terminal device that includes a list of elements not only includes those elements but can also include other elements which are not expressly listed, or further include elements inherent to the process, method, article, or terminal device. Additionally, unless otherwise specified, an element limited by "include a/an . . . " does not exclude other same elements from the process, the method, the article, or the terminal device that includes the element.

Exemplary operation retry methods and apparatuses for a job according to some embodiments of the present application are described above in detail. Although the principles and implementation manners of the present application are described by using specific examples herein, the foregoing description is only intended to facilitate understanding of the methods and core concepts of the present application. A person of ordinary skill in the art may make variations to the specific implementation manners and according to the principles of the present application. The content of the specification should not be construed as a limitation to the scope of present application.

The invention claimed is:

1. A job operation retry method in a computing device, comprising:
   detecting a failure of an operation of a job during execution of the operation of the job;
   collecting, in response to the detection of the failure of the operation, statistics on a completion degree of the job;
   calculating a retry interval according to the completion degree of the job, comprising:
      configuring an incremental factor based on the completion degree of the job,
      calculating a retry interval base based on a preset interval and a current number of retries, and
      calculating the retry interval based on the incremental factor and the retry interval base; and
   resuming the execution of the operation after waiting for the retry interval.

2. The method according to claim 1, wherein the job is a data synchronization job, and wherein detecting the failure of the operation of the job comprises at least one of:
   confirming the failure of the operation of the job when data reading from a source device fails or times out;
   confirming the failure of the operation of the job when interaction with a data synchronization service fails or times out; and
   confirming the failure of the operation of the job when data writing into a destination device fails or times out.

3. The method according to claim 1, wherein calculating the retry interval base based on the preset interval and the current number of retries comprises:
   acquiring the current number of retries; and
   calculating a product of the preset interval and the current number of retries as the retry interval base, or exponentially increasing the preset interval based on the current number of retries as the retry interval base.

4. The method according to claim 1, wherein before collecting statistics on the completion degree of the job, the method further comprises:
   determining whether the operation needs to be re-executed; and
   in response to the determination that the operation needs to be re-executed, collecting statistics on the completion degree of the job; and
   in response to the determination that the operation does not need to be re-executed, exiting re-execution of the operation.

5. The method according to claim 4, wherein determining whether the operation needs to be re-executed comprises:
   determining whether a number-of-retries condition or a state condition is satisfied;
   in response to the determination that the number-of-retries condition or the state condition is satisfied, determining that the operation does not need to be re-executed; and
   in response to the determination that the number-of-retries condition or the state condition is not satisfied, determining that the operation needs to be re-executed;
   wherein the number-of-retries condition is associated with a preset number-of-retries threshold, and the state condition is associated with the job being stopped.

6. A job operation retry apparatus, comprising:
   a memory storing a set of instructions; and
   one or more processors configured to execute the set of instructions to cause the apparatus to perform:
      detecting a failure of an operation of a job during execution of the operation of the job;
      collecting statistics on a completion degree of the job, in response to the detection of the failure of the operation;

calculating a retry interval according to the completion degree of the job, comprising:
  configuring an incremental factor based on the completion degree of the job,
  calculating a retry interval base based on a preset interval and a current number of retries, and
  calculating the retry interval based on the incremental factor and the retry interval base; and
resuming the execution of the operation after waiting for the retry interval.

7. The apparatus according to claim 6, wherein the job is a data synchronization job, and wherein the one or more processors are configured to execute the set of instructions to cause the apparatus to further perform at least one of the following:
  confirming the failure of the operation of the job when data reading from a source device fails or times out;
  confirming the failure of the operation of the job when interaction with a data synchronization service fails or times out; or
  confirming the failure of the operation of the job when data writing into a destination device fails or times out.

8. The apparatus according to claim 6, wherein calculating the retry interval base based on the preset interval and the current number of retries comprises:
  acquiring the current number of retries; and
  calculating a product of the preset interval and the current number of retries as the retry interval base, or exponentially increasing the preset interval based on the current number of retries as the retry interval base.

9. The apparatus according to claim 6, wherein the one or more processors are configured to execute the set of instructions to cause the apparatus to further perform:
  determining whether the operation needs to be re-executed;
  in response to a determination that the operation needs to be re-executed, collecting statistics on the completion degree of the job;
  in response to a determination that the operation does not need to be re-executed, exiting re-execution of the operation.

10. The apparatus according to claim 9, wherein the one or more processors are configured to execute the set of instructions to cause the apparatus to further perform:
  determining whether a number-of-retries condition or a state condition is satisfied;
  in response to a determination that the number-of-retries condition or the state condition is satisfied, determining that the operation does not need to be re-executed;
  in response to a determination that the number-of-retries condition or the state condition is satisfied determining that the operation needs to be re-executed;
  wherein the number-of-retries condition is associated with a preset number-of-retries threshold, and the state condition is associated with the job being stopped.

11. A non-transitory computer readable medium that stores a set of instructions that is executable by at least one processor of a computer to cause the computer to perform a job operation retry method, comprising:
  detecting a failure of an operation of a job during execution of the operation of the job;
  collecting, in response to the detection of the failure of the operation, statistics on a completion degree of the job;
  calculating a retry interval according to the completion degree of the job, comprising:
    configuring an incremental factor based on the completion degree of the job,
    calculating a retry interval base based on a preset interval and a current number of retries, and
    calculating the retry interval based on the incremental factor and the retry interval base; and
  resuming the execution of the operation after waiting for the retry interval.

12. The non-transitory computer readable medium according to claim 11, wherein the job is a data synchronization job, and wherein detecting the failure of the operation of the job comprises at least one of:
  confirming the failure of the operation of the job when data reading from a source device fails or times out;
  confirming the failure of the operation of the job when interaction with a data synchronization service fails or times out; and
  confirming the failure of the operation of the job when data writing into a destination device fails or times out.

13. The non-transitory computer readable medium according to claim 11, wherein calculating the retry interval base based on the preset interval and the current number of retries comprises:
  acquiring the current number of retries; and
  calculating a product of the preset interval and the current number of retries as the retry interval base, or exponentially increasing the preset interval based on the current number of retries as the retry interval base.

14. The non-transitory computer readable medium according to claim 11, wherein before collecting statistics on the completion degree of the job, the set of instructions that is executable by the at least one processor of the computer causes the computer to further perform:
  determining whether the operation needs to be re-executed; and
  in response to the determination that the operation needs to be re-executed, collecting statistics on the completion degree of the job; and
  in response to the determination that the operation does not need to be re-executed, exiting re-execution of the operation.

15. The non-transitory computer readable medium according to claim 14, wherein determining whether the operation needs to be re-executed comprises:
  determining whether a number-of-retries condition or a state condition is satisfied;
  in response to the determination that the number-of-retries condition or the state condition is satisfied, determining that the operation does not need to be re-executed; and
  in response to the determination that the number-of-retries condition or the state condition is not satisfied, determining that the operation needs to be re-executed;
  wherein the number-of-retries condition is associated with a preset number-of-retries threshold, and the state condition is associated with the job being stopped.

* * * * *